US009998431B2

(12) United States Patent
Smith et al.

(10) Patent No.: US 9,998,431 B2
(45) Date of Patent: Jun. 12, 2018

(54) SYSTEM, APPARATUS AND METHOD FOR SECURE NETWORK BRIDGING USING A RENDEZVOUS SERVICE AND MULTIPLE KEY DISTRIBUTION SERVERS

(71) Applicant: Intel Corporation, Santa Clara, CA (US)

(72) Inventors: Ned M. Smith, Beaverton, OR (US); Mats G. Agerstam, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 14/864,940

(22) Filed: Sep. 25, 2015

(65) Prior Publication Data

US 2016/0366105 A1 Dec. 15, 2016

Related U.S. Application Data

(60) Provisional application No. 62/172,889, filed on Jun. 9, 2015.

(51) Int. Cl.
*H04L 29/06* (2006.01)
*H04L 29/08* (2006.01)
(Continued)

(52) U.S. Cl.
CPC ........ *H04L 63/0428* (2013.01); *H04L 63/061* (2013.01); *H04L 63/065* (2013.01);
(Continued)

(58) Field of Classification Search
CPC .. H04L 67/1063; H04W 12/00; H04W 76/023
See application file for complete search history.

(56) References Cited

U.S. PATENT DOCUMENTS 6,725,276 B1 * 4/2004 Hardjono ............ H04L 12/1836 709/238
7,234,063 B1 6/2007 Baugher et al.
(Continued)

FOREIGN PATENT DOCUMENTS

JP 2001148694 5/2001

OTHER PUBLICATIONS

International Searching Authority, "Notification of Transmittal of the International Search Report and the Written Opinion of the International Searching Authority," dated Aug. 16, 2016 in International application No. PCT/US2016/033827.
(Continued)

*Primary Examiner* — Beemnet Dada
(74) *Attorney, Agent, or Firm* — Trop, Pruner & Hu. P.C.

(57) ABSTRACT

In one embodiment, a method includes: receiving, in a rendezvous server (RS), a first registration message (FRM) from a first registrar of a first network domain (FND), the FRM including a first device roster of a plurality of first devices of the FND; receiving, in the RS, a second registration message (SRM) from a second registrar of a second network domain (SND), the SRM including a second device roster of a plurality of second devices of the SND; and generating a first rendezvous point (RP) based at least in part on a plurality of key management server identifiers each associated with a key management server of the FND and SND, the first RP to enable the plurality of key management servers to perform key management exchange to generate at least one group key.

25 Claims, 5 Drawing Sheets

(51) Int. Cl.
*H04W 76/02* (2009.01)
*H04W 12/04* (2009.01)
*H04W 88/16* (2009.01)

(52) U.S. Cl.
CPC ......... *H04L 67/1063* (2013.01); *H04W 12/04* (2013.01); *H04W 76/023* (2013.01); *H04W 88/16* (2013.01)

(56) References Cited

U.S. PATENT DOCUMENTS

| | | | | |
|---|---|---|---|---|
| 2001/0018348 | A1* | 8/2001 | Joshi | H04B 7/18517 455/450 |
| 2007/0143600 | A1 | 6/2007 | Kellil et al. | |
| 2007/0160201 | A1* | 7/2007 | Blom | H04L 9/0844 380/30 |
| 2013/0159479 | A1* | 6/2013 | Vasseur | H04L 47/10 709/221 |
| 2015/0127742 | A1 | 5/2015 | Bhogal et al. | |
| 2015/0281344 | A1* | 10/2015 | Grootwassink | H04L 67/104 713/168 |

OTHER PUBLICATIONS

Wikipedia, "OSI Model", https://en.wikipedia.org/wiki/OSI_model#Layer_4:_Transport_Layer, Jun. 8, 2015, 7 pages.

Wikipedia, "Key Management", https://en.wikipedia.org/wiki/Key_management, May 19, 2015, 5 pages.

Wikipedia, "Publish—Subscribe Pattern", https://en.wikipedia.org/wiki/Publish%E2%80%93subscribe_pattern, Mar. 18, 2015, 4 pages.

Wikipedia, "Data Distribution Service", https://en.wikipedia.org/wiki/Data_Distribution_Service, May 21, 2015, 5 pages.

Wikipedia, "Kerberos (Protocol)", https://en.wikipedia.org/wiki/Kerberos_%28protocol%29, May 7, 2015, 6 pages.

Stackexchange, "Cryptography", http://crypto.stackexchange.com/questions/3682/how-can-the-diffie-hellman-key-exchange-be-extended-to-three-parties, Aug. 30, 2012, 1 page.

Wikipedia, "XMPP", https://en.wikipedia.org/wiki/XMPP, May 22, 2015, 7 pages.

IBM Mobilefirst, "Pairwise and Group Keys", http://etutorials.org/Networking/802.11+security.+wi-fi+protected+access+and+802.11i/Part+II+The+Design+of+Wi-Fi+Security/Chapter+10.+WPA+and+RSN+Key+Hierarchy/Pairwise+and+Group+Keys/, accessed Sep. 3, 2015, 6 pages.

Hardjono, et al., "Fluffy: Simplified Key Exchange for Constrained Environments", draft-hardjono-ace-fluffy-00, Mar. 23, 2015, 24 pages, Intel Corporation.

openinterconnect.org, "Open Interconnect Consortium: An Overview to Connect Devices Everywhere", http://openinterconnect.org/wp-content/uploads/2015/07/Open-Interconnect-ConsortiumOverview_Final-.pdf, Jul. 2015, 7 pages.

openinterconnect.org, "The Open Interconnect Consortium and IoTivity", http://openinterconnect.org/wp-content/uploads/2015/07/OIC-IoTivity_White-Paper_Final1.pdf, Jul. 2015, 5 pages.

openinterconnect.org, "Cloud-Native Architecture and the Internet of Things", http://openinterconnect.org/wp-content/uploads/2015/07/Cloud-Native-IoT-White-Paper_white_centered_Final.pdf, Jul. 2015, 3 pages.

openinterconnect.org, "Freedom to Implement: OIC and IoTivity", http://openinterconnect.org/wp-content/uploads/2015/07/OIC-IoT-Standards-and-Implementation_White-Paper_Final.pdf, Jul. 2015, 2 pages.

U.S. Appl. No. 14/863,043, filed Sep. 23, 2015, entitled "System, Apparatus and Method for Group Key Distribution on for a Network" by Ned M. Smith.

U.S. Appl. No. 14/864,957, filed Sep. 25, 2015, entitled "System, Apparatus and Method for Managing Lifecycle of Secure Publish-Subscribe System" by Ned M. Smith, et al.

U.S. Appl. No. 14/865,576, filed Sep. 25, 2015, entitled "System, Apparatus and Method for Secure Coordination of a Rendezvous Point for Distributed Devices Using Entropy Multiplexing" by Ned M. Smith, et al.

U.S. Appl. No. 14/865,191, filed Sep. 25, 2015, entitled "System, Apparatus and Method for Multi-Owner Transfer of Ownership of a Device" by Jesse Walker, et al.

U.S. Appl. No. 14/865,198, filed Sep. 25, 2015, entitled "System, Apparatus and Method for Transferring Ownership of a Device From Manufacturer to User Using an Embedded Resource" by Ned M. Smith, et al.

U.S. Appl. No. 14/856,857, filed Sep. 17, 2015, entitled "System, Apparatus and Method for Access Control List Processing in a Constrained Environment" by Ned M. Smith, et al.

U.S. Appl. No. 14/859,572, filed Sep. 21, 2015, entitled "System, Apparatus and Method for Privacy Preserving Distributed Attestation for Devices" by Ned M. Smith, et al.

U.S. Appl. No. 14/863,496, filed Sep. 24, 2015, entitled "System, Apparatus and Method for Stateful Application of Control Data in a Device" by Nathan Heldt-Sheller, et al.

U.S. Appl. No. 14/998,275, filed Dec. 26, 2015, entitled "System, Apparatus and Method for Auto-Optimization of Access Control Policy and Key Management in a Network Authoring Tool" by Ned M. Smith, et al.

U.S. Appl. No. 15/045,676, filed Feb. 17, 2016, entitled "System, Apparatus and Method for Security Interoperability Path Analysis in an Internet of Things (IOT) Network" by Ned M. Smith, et al.

U.S. Appl. No. 62/172,962, filed Jun. 9, 2015, entitled "Providing Protected Content in an IoT Network" by Ned M. Smith, et al.

U.S. Appl. No. 14/968,125, filed Dec. 14, 2015, entitled "A Self-Configuring Key Management System for an Internet of Things Network" by Ned M. Smith.

U.S. Appl. No. 14/757,750, filed Dec. 23, 2015, entitled "System, Apparatus and Method for Optimizing Symmetric Key Cache Using Tickets Issued by a Certificate Status Check Service Provider" by Jed M. Smith, et al.

U.S. Appl. No. 14/976,165, filed Dec. 21, 2015, entitled "System, Apparatus and Method for Migrating a Device Having a Platform Group" by Ned M. Smith, et al.

U.S. Appl. No. 14/977,742, filed Dec. 22, 2015, entitled "System, Apparatus and Method for Safety State Management of Internet Things (IoT) Devices " by Ned M. Smith, et al.

Wikipedia, "Tor", https://en.wikipedia.org/wiki/Tor_%28anonymity_network%29 , Jun. 4, 2015, 14 pages.

Networkworld, "A guide to the confusing Internet of Things standards world", http://www.networkworld.com/article/2456421/internet-of-things/a-guide-to-the-confusing-internet-of-things-standards-world.html, Jul. 21, 2014, 7 pages.

* cited by examiner

SYSTEM, APPARATUS AND METHOD FOR SECURE NETWORK BRIDGING USING A RENDEZVOUS SERVICE AND MULTIPLE KEY DISTRIBUTION SERVERS

CROSS-REFERENCE TO RELATED APPLICATION

This application claims priority to U.S. Provisional Patent Application No. 62/172,889 filed on Jun. 9, 2015 and entitled "SYSTEM, APPARATUS AND METHOD FOR SECURE NETWORK BRIDGING USING A RENDEZVOUS SERVICE AND MULTIPLE KEY DISTRIBUTION SERVERS", the content of which is hereby incorporated by reference.

BACKGROUND

One challenge facing Internet of Things (IoT) networks is how to bridge two or more IoT networks that do not share a common administrative domain (which may, among other things, establish a root key management hierarchy). Additionally, IoT networks may be built using dissimilar Open Systems Interconnection (OSI) model transport layers. This may then require protocol translation and proxying at a gateway. However, protocol translation may not be sufficient to bridge IoT networks considering the wide range of, for example, sensor and actuation devices that may be present in the IoT networks. Among the issues with bridging IoT networks from different IoT domains is the need to first establish a connectivity path and an end-to-end security path that bridges the respective network domains. This is complex considering bridging semantics occur above the transport layer.

BRIEF DESCRIPTION OF THE DRAWINGS

Features and advantages of embodiments of the present invention will become apparent from the appended claims, the following detailed description of one or more example embodiments, and the corresponding figures. Where considered appropriate, reference labels have been repeated among the figures to indicate corresponding or analogous elements.

DETAILED DESCRIPTION

Figure 1:
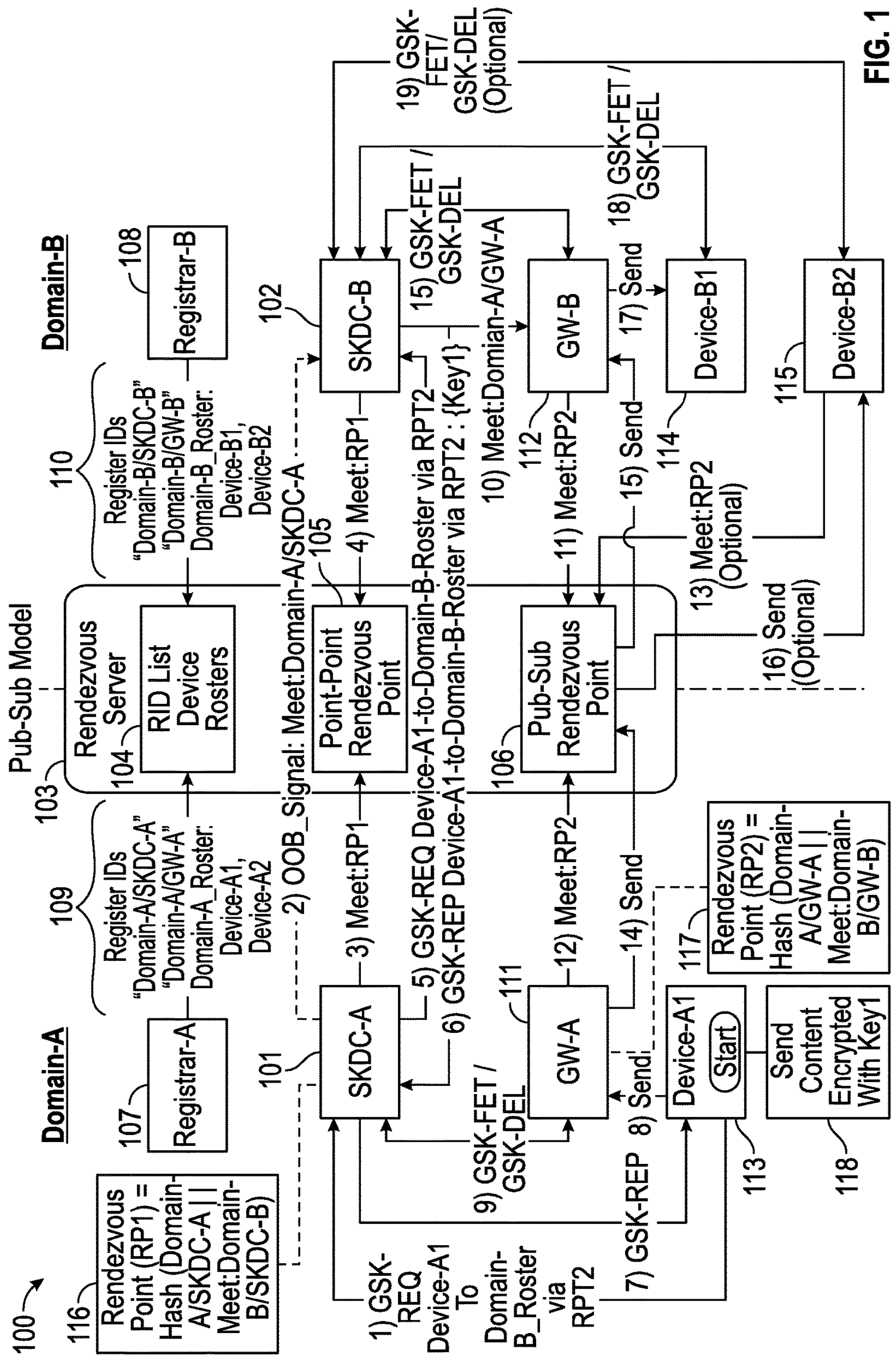
FIG. 1 is a block diagram of a publisher-subscriber rendezvous model in accordance with an embodiment.

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner.

In various embodiments, a cross-domain command-and-control message bus may be established using a "rendezvous server". The rendezvous server creates a safe zone between two (or more) IoT network domains where discovery, security and data exchange can be negotiated between devices on the domains. As described herein, the rendezvous server may address security concerns such as compromises to privacy (e.g., may ensure the rendezvous server does not have keys to inspect encrypted messages passing between devices of disparate domains), data confidentiality, integrity, and denial of service.

As the "safe zone" may be open to a variety of IoT networks, key management is not provided by the rendezvous server in an embodiment. Rather, key management is distributed across the participating domains. The rendezvous server plays a role in enabling the respective key management servers to negotiate/perform cross-domain key management tasks. The rendezvous server allows the intended domains to find each other (which would otherwise be very complicated) and construct end-to-end data exchange connections for both peer-peer and publication-subscription (pub-sub) message exchange. Embodiments achieve these goals by employing several distributed computing building blocks.

In an embodiment, a rendezvous server includes a registration interface where domain registrars may identify key management servers, gateway devices, and other devices reachable through the rendezvous server. Such a server may also include one or more peer-peer or pub-sub rendezvous points where message exchange processing may be performed. Without loss of generality, an XMPP (RFC6120, 6121, 6122—Extensible Messaging and Presence Protocol) server is an example system that may be configured, as described herein, to implement some of the capabilities of a rendezvous server. Such a server is just an example that demonstrates a possible implementation approach. However, unlike embodiments described herein, XMPP servers lack integration of distributed key management and out-of-band signaling of an agreed upon rendezvous point and therefore may be insufficient.

In an embodiment, one of the devices publishing its existence in the rendezvous server is a key management server (e.g., Kerberos (RFC3121) or Fluffy: Simplified Key Exchange for Constrained Environments, draft-hardjono-ace-fluffy-00 (draft IETF Specification Mar. 23, 2015) (https://tools.ietf.org/id/draft-hardjono-ace-fluffy-00***txt) key distribution center, simple key distribution center (KDC/SKDC), respectively). The key management server advertises its availability using a rendezvous server-supplied identifier (RID). The RID allows a device from a different IoT network to discover key management servers from a foreign network. Embodiments may employ a series of out-of-band mechanisms for informing the key management servers which key management server from the opposing network domain is the expected server. Without this method, the servers would perform an exhaustive search of every device that is visiting the rendezvous server share area.

A variety of out-of-band techniques may be used because each real-world scenario brings with it contextual elements that favor some out-of-band method over others. The primary goal of the out-of-band method in some embodiments is to inform one key management service from one domain which key management service from the opposing domain to contact. The out-of-band signal communicates the RID value used for a second SKDC to construct a rendezvous point (e.g., see "RP1" of FIG. 1), where RP1 is a hash of the rendezvous asset identifiers (RID) established during registration. Out-of-band communication may further contain reference/URI to intended resources to be accessed or access control lists (ACLs) that may inform privilege attribute capabilities (PAC) structures to be associated with the key.

An ACL, with respect to a computer file system, is a list of permissions attached to an object. An ACL specifies which users or system processes are granted access to objects, as well as what operations are allowed on given objects. Each entry in a typical ACL specifies a subject and an operation.

Although the scope of the present invention is not limited in this regard, some example out-of-band methods for communicating RIDs include the following: (1) endpoint devices seeking to establish a connection use a text message containing the RID of the opposite domain key management server; (2) a QR code containing RID information is printed on a user device that may be orchestrating the connection process; (3) a URL containing RID information is posted to a browser that then informs the key management server of the RID information; (4) an OAuth2 token is issued containing RID information that is delivered to the key management server; (5) a digital camera detects RID information encoded into a LED display's interlacing protocol such that by directing the camera at a powered LED display, regardless of what is currently being displayed, the rendezvous server can be informed regarding the respective IoT domains (phone vs. LED display); (6) an ultrasonic chirp that modulates the enrollment request using, for example frequency, amplitude, and/or phase-shift keying (or a link to it); (7) an NFC passive or active tag containing the complete enrollment request or a link to it; and (8) body area network transferring the enrollment request or a link to it.

In an embodiment, the key management server uses the RID to quickly find the key management server for the opposing domain. The RID information can be used by the rendezvous server to construct a message exchange path between respective key management servers. This message exchange path may be a one-to-one message exchange or many-to-many message exchange using publish-subscribe. Key management servers establish a secure and attested session between them (e.g., Diffie-Hellman over transport layer security (TLS) or Intel® Sigma/SigmaCE (sign and MAC) session) where a request is made from Device A in the first domain and forwarded to a key manager of the second domain. A Device B in the second domain, which is the intended target of communication, is informed the ticket is available for use.

The key management servers use the key management exchanges to establish a cross-domain context so that it is clear to the endpoint devices the intended use of the negotiated key (i.e., that it is to be used for cross-domain device-to-device interactions).

A goal of establishing a cross-domain command-and-control message bus is to build a connection between constrained devices (A and B) using proxy devices. Proxy devices know how to connect to the rendezvous server and further how to connect to constrained devices within a respective IoT network. Constrained devices lack native capability to connect directly to a rendezvous server. The gateway device performs message routing via the rendezvous server and does session establishment through the same server using a negotiated rendezvous point.

Subsequently, an end-to-end secure session can be established where the rendezvous server is prevented from snooping; but where a respective gateway device may obtain the key used by the device endpoints to perform security or other analysis of the data exchanged.

Embodiments anticipate multi-party SKDC operation coordination across three or more domains. To facilitate this, a rendezvous service may provide a rendezvous point that is the aggregation of multiple SKDCs (e.g., RP=Sha2(SKDC-A, SKDC-B, SKDC-C, . . . ). The RP may be used to coordinate multi-SKDC group key creation. The SKDCs participating may form a roster that informs the issuing SKDC which additional SKDCs should make a GSK-FET request. The OOB signaling ensures participating SKDCs are aware of the option to make the GSK-FET requests, which results in the SKDC being able to service local GSK-FET requests from its community of devices.

Referring now to FIG. 1, shown is a block diagram of a publisher-subscriber rendezvous model 100 in accordance with an embodiment. In this arrangement, a negotiated group key (Key1) is implemented using distributed key managers (101, 102) and a rendezvous server (103). The rendezvous server may further facilitate pub-sub message exchange of an encrypted message (occurring at 106). In FIG. 1, the system can be considered in three operational stages.

In Stage 1, registrars 107, 108 from respective IoT network domains (Domain-A, Domain-B) register domain specific services visible to a rendezvous service as well as the devices that may not directly interact with the rendezvous service. These devices may be considered a device roster. Any number of device rosters may be created having a variety of configurations. Hence, the device roster may also be considered a device group method that may be used to inform a key management server regarding issuance of group credentials. Thus, in FIG. 1 roster 104 includes device rosters 109, 110, which in turn include device IDs, as well as gateway and SKDC IDs (wherein IDs are also referred to as identifiers).

In Stage 2, distributed key management services may coordinate using a rendezvous server over the generation of a group key that may be used to protect content aimed at a specific group roster. The rendezvous server may host a large variety of domains, some of which are not intended collaborators among key management servers. Embodiments allow out-of-band (i.e., not brokered by the Rendezvous server) as well as in-band methods for discovering which set of SKDCs negotiate a group key. The primary objective of out of band exchange is to inform the SKDC which other SKDC will communicate over a rendezvous point. Thus, in FIG. 1 at "start" Device-A1 113 issues a GSK-REQ (see element (1)) to begin the process of establishing a group key so devices 113, 114, 115 can communicate with each other across domains (as well as with other devices in still other domains). SKDC-A then emits an out-of-band communication (see element (2)) to alert other SKDCs, such as SKDC-B, of a desire to meet.

A rendezvous point 105 is constructed by both domains Domain-A and Domain-B contributing some information, e.g., their RID (see element 116). A hash function may be used to combine respective RID information to produce a unique rendezvous point identifier, e.g., RP=hash(RID1, RID2, . . . RIDn). Using the RP, the respective key managers meet (element (3) and (4)) to perform key management exchanges (such as those defined by draft-hardjono-fluffy- 00 specification referred to herein) to negotiate a group key (key1). More specifically, in an embodiment a GSK-REQ request is sent across domains (element (5)) with a corresponding GSK-REP (element (6)) that includes the group key. The reply and group key may be wrapped with a session key negotiated between SKDCs A and B using a Diffie-Hellman protocol. If three domains (e.g., Domain-C) are involved the Diffie-Hellman protocol may be extended to three domains so a SKDC from each domain shares the session key, which may be a temporal key. The reply and key may be forwarded to Device-A1 (element (7)). This communication may be performed with the reply and/or key wrapped using pair wise keys shared between SKDC-A and Device-A1.

In Stage 3, a second rendezvous point (RP2) 106 is created to facilitate secure message exchange for pub-sub messages. The RP2 value is a hash 117 of the gateway devices' RIDs brokering constrained device access as well as RIDs of devices that can directly access the rendezvous server (element 117). The RP2 is used to publish an encrypted message to the subscriber list (elements (15), (16)). Subscribers obtain the decryption key dynamically from the local SKDC (elements (7), (18), (19)), SKDC-A for Domain-A or SKDC-B for Domain-B. More specifically, FIG. 1 includes an embodiment whereby it is desired that gateway GW-A be able to access content from Device-A1 in the clear. This may be desirable should Device-A1 be constrained and unable to consult an access policy and the like, thereby relying on the gateway to do so. Thus, GW-A may utilize fetch and deliver commands (element (9)) to obtain the group key to inspect content (e.g., video) sent from Device-A1 (element (8)). The group key may be wrapped with the session key negotiated via a Diffie-Hellman exchange addressed above. In the other domain the SKDC may inform (element (10)) GW-b of the desired meeting between gateways at RP2. The meeting may occur (elements (11) and (12)). Some devices that are less constrained may join the RP2 without using a gateway (element (13)). Encrypted content (encrypted with the group key) is then published to subscribers (elements 118, (14), (15), (16), (17)).

In embodiments, it may be ensured that the key is used within the appropriate context for which it was issued. The key management messages are designed to capture the rendezvous point semantics. Table 1 shows a mapping of context to key management messages in a representative example. There the realms and names of the respective participants in their respective organizations (i.e., domains and sub-domains) are identified as 'context' such that a security policy (e.g., firewall traversal rule) may be meaningfully applied when a request is made to obtain a ticket or certificate enabling cryptographic exchange between the respective participants.

TABLE 1

```
GSK-REQ : Device-A1 To Device-B1 via GW-A
Skdcrealm = SKDC-B
Crealm = Domain-A
Cname = Device-A1
Mcastrealm = RP2
Mcastname = Domain-B_Roster
GSK-REP :
Crealm = Domain-A
Cname = Device-A1
Recpt = [
   Skdcrealm = SKDC-B
   Mcastrealm = RP2
```

TABLE 1-continued

```
   Mcastname = Domain-B_Roster
   Key = {Key1}
]
GSK-FET:
Crealm = Domain-A / Domain-B
Cname = GW-A / GW-B / Device-B1 (/ Device-B2)
Mcastrealm = RP2
Mcastname = Domain-B_Roster
GSK-DEL:
Crealm = Domain-A / Domain-B
Cname = GW-A / GW-B / Device-B1 (/ Device-B2)
Recpt = [
   Skdcrealm = SKDC-B
   Mcastrealm = RP2
   Mcastname = Domain-B_Roster
   Key = {Key1}
]
```

Figure 2:
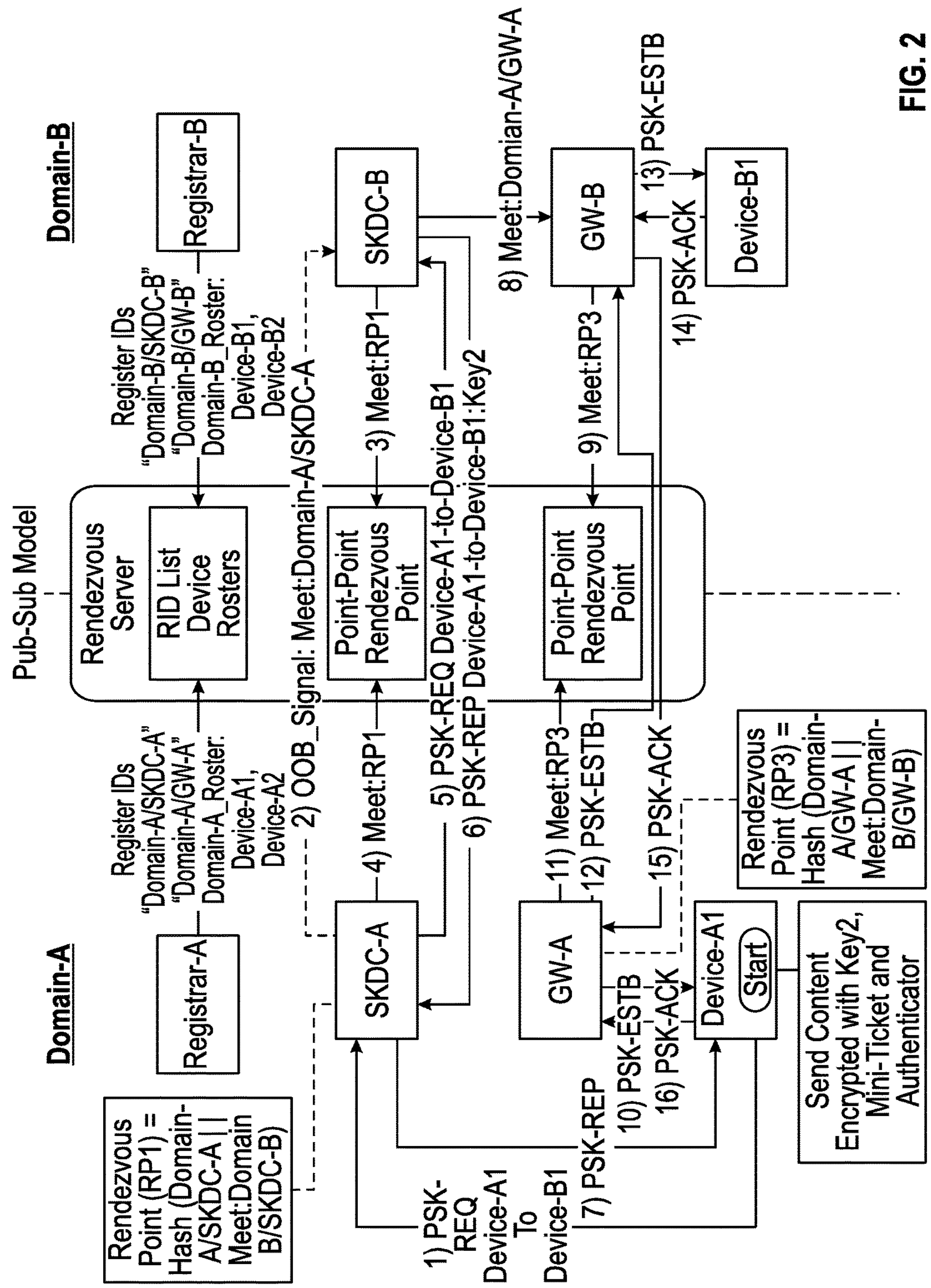
FIG. 2 is a block diagram of a peer-to-peer (also referred to herein as peer-peer) rendezvous model in accordance with an embodiment.

Referring now to FIG. 2, shown is a block diagram of a Peer-Peer rendezvous model in accordance with an embodiment. As shown in FIG. 2 the system model is largely the same as in FIG. 1, but attention is given to a peer-peer rendezvous operation. Like components are not readdressed for purposes of brevity.

In this model, the use of gateway devices (GW-A, GW-B) is implied but non-gateway requiring devices (similar to Device-B2 of FIG. 1) are possible in other embodiments. If a device is constrained and cannot directly interact with the rendezvous server, the SKDC determines which GW device may serve as a proxy for message exchange. The GW device may not be trusted to inspect data packets, hence the PSK-REP need not be shared with the GW-A device. Similarly, the PSK-ESTB message containing the ticket may be protected using the SKDC-B key shared only with Device-B1; leaving GW-B unable to inspect message contents. Nevertheless, the SKDC-B may determine, independently of Domain-A operations that GW-B should inspect message contents, and may provide a version of the mini-ticket that the GW-B may use to inspect message contents.

Of note, PSK instead of GSK messaging is employed for this example in light of the Fluffy protocol addressed above. Therefore, slight differences occur at elements (5), (6), (10), (12)-(16) basically indicating this embodiment is for Peer-Peer instead of pub-sub and therefore fewer devices must be bridged to each other.

In various embodiments, the key is used within the appropriate context for which it was issued. The key management messages are designed to capture the rendezvous point semantics. Table 2 shows the mapping of context to key management messages in an example representation.

TABLE 2

```
PSK-REQ : Device-A1-To-Device-B1
Skdcrealm = SKDC-B
Crealm = Domain-A
Cname = Device-A1
Sprealm = Domain-B
Spname = Device-B1
PSK-REP:
Crealm = Domain-A
Cname = Device-A1
MiniTicket = 1
   Skdcrealm = SKDC-B
   Sprealm = Domain-B
   Spname = Device-B1
   EncPart = {
      Key = Key2
      Crealm = Domain-A
      Cname = Device-A1
```

TABLE 2-continued

```
        Transited = SKDC-A, SKDC-B
    }
]
Receipt = [
    Skdcrealm = SKDC-B
    Sprealm = Domain-B
    Spname = Device-B1
    EncPart = {
        Key = Key2
    }
]
PSK-ESTB:
Miniticket = [ <same as above> ]
Authenticator = [
    Crealm = Domain-A
    Cname = Device-A1
]
PSK-ACK:
Sprealm = Domain-B
Spname = Device-B1
```

Embodiments may be realized using IoT frameworks such as Open Interconnect Consortium (OIC) or Alljoyn, and may use OS-supplied protection mechanisms in the form of a container technology such as Docker™, Smack extensions to Linux, hardware Trusted Execution Environment (TEE) protection mechanisms such as Intel® SGX, Intel® CSE, Intel® VT-X, Intel® MemCore, and ARM® TrustZone.

Figure 3:
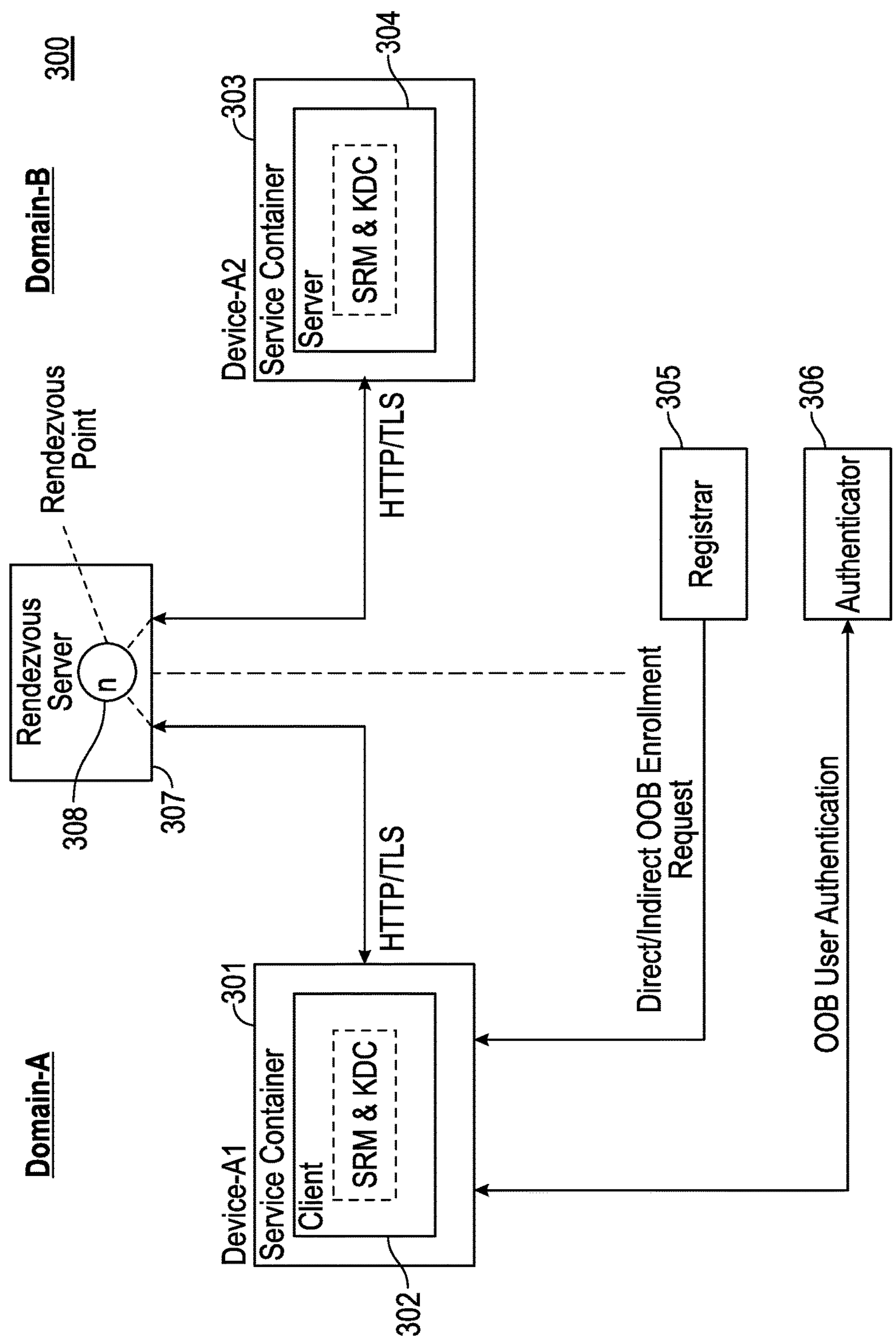
FIG. 3 is a block diagram of a system in accordance with another embodiment.

Referring now to FIG. 3, shown is a block diagram of a system 300 in accordance with an embodiment. In the embodiment of FIG. 3, a key management service (KDC) may be implemented within a hardened element within an IoT device abstraction layer. As an example, an OIC Secure Resource Manager may implement the SKDC function to harden it and reduce attack surface. The service container is the application or service providing the execution environment for the client and server respectively. The client service container 301 hosts the OIC client 302 that will access the protected resource. The server service container 303 hosts the OIC server 304 that hosts the protected resources. The OIC server embeds a Secure Resource Manager (SRM) that provides the access control policy function of the resources and the SKDC. The registrar 305 is an out of band component used by Domain B to issue an enrollment or invitation request to Device-A1. Direct enrollment indicates the enrollment is directly sent to the client. The registrar 305 could also send an out of band message containing a link that could enforce an authentication step before the enrollment request is issued (indirect enrollment). A registrar could optionally redirect the client to perform an authentication step. If enforced, the enrollment request is issued upon successful authentication by authenticator 306. Each OIC instance (client, which is analogous to SKDC-A, and server, which is analogous to SKDC-B), has a secure connection to the rendezvous server 307 over (D)TLS or HTTPS. The rendezvous server 307 provides a rendezvous point 308 facility where devices from domains A and B can meet respectively.

Thus, FIG. 3 provides examples of how to harden certain facets of the models of FIGS. 1 and 2. For example, if a device such as Device-A1 does not have a sandbox service container then access protocols may require the device access other domains via a gateway (client) that does provide such a sandboxed environment. Thus, the "client" 302 and "server" 304 of FIG. 3 may be the SKDC-A, SKDC-B of FIGS. 1 and/or 2, and/or the GW-A, GW-B of FIGS. 1 and/or 2. The rendezvous point 308 of FIG. 3 is addressed as "Rendezvous Server n" to indicate it may be RP1, RP2, or some other rendezvous point with the main concept being the hardening of nodes that communicate across domains.

In an embodiment, a method for using a rendezvous server to negotiate keys and set up a secure communication channel follows three steps: 1) register domain assets (aka enrollment); 2) establish rendezvous points; and 3) establish communications channel via the rendezvous server.

In the Enrollment stage, the Rendezvous Service expects each domain to register resources that may be discoverable by other domains. A device in a first domain may discover a device in a second domain subsequent to domain registration. The following BNF of Table 3 illustrates contents in an enrollment request which is part of registration step in an example.

TABLE 3

```
<enrollmentRequest> = <rendezvous-point>,<resources>,[<ACL>]
    <rendezvous-point> = <r-type>,<r-name>
    <r-type> = "pubsub" | "direct-p2p"
    <r-name> = <String>
    <resources> = <resource>,{<resource>}
    <resource> = <schema>,<Authority-ID>,<URI-Path>
    <schema> = <String>,"://"
    <Authority-ID> = <String>
    <URI-Path> = <String>
```

The enrollment request may also be delivered using an out-of-band mechanism (as described earlier) as a way to trigger coordination using the rendezvous point.

In the rendezvous point stage, a device (e.g., Device-A1) connects to a second device (e.g., device-B1) at the rendezvous point named by the enrollment request. The rendezvous point can be realized by either a peer-to-peer or multi-cast message. The SKDC in Domain A can use the communication channel above to negotiate the encryption key used data protection. During this step additional information about the device may be disclosed including an ACL that may be constructed by the SKDC and provisioned to the SRM of the servicing data requests.

DTLS is an example data protection protocol that may be established using negotiated keys. The key exchange communication channel via the rendezvous server (e.g., XMPP in-band bytes stream) need not be protected using DTLS or other channel security scheme.

A single rendezvous point name can be constructed, e.g., for pub/sub using the names of the domains that interact: Node-name=Base64(SHA-256(Domain A|Domain B))

In a Communication stage, a secure communication channel for message exchange is established when the key contained in the ticket (or supplied in response to the GSK-FET message) is used to protect message content. The Rendezvous server provides send-receive or publish-subscribe capabilities which the protected content flows. The SKDC ticket may further contain resource specific control policy (e.g., OIC CRUDN). Endpoint devices as well as gateway proxy devices may ACL policies.

Embodiments thus use a distributed/multiple key managers and a rendezvous service to perform inter-domain and intra-domain key management. Embodiments also provide distributed/multiple key managers and a rendezvous service to distribute group keys, which may be used to establish peer-to-peer and pub-sub rendezvous points for exchanging key management exchanges. Use of such rendezvous service may realize exchange of peer-to-peer or pub-sub content that is protected from observation by a rendezvous service. Embodiments also use distributed/multiple key managers and a rendezvous service to setup an inter-domain pub-sub system having multiple key management servers and multiple subscribers from each of the participating domains. Out-of-band signaling may use contextual devices to orchestrate and coordinate key management by multiple key distribution center services.

Figure 4:
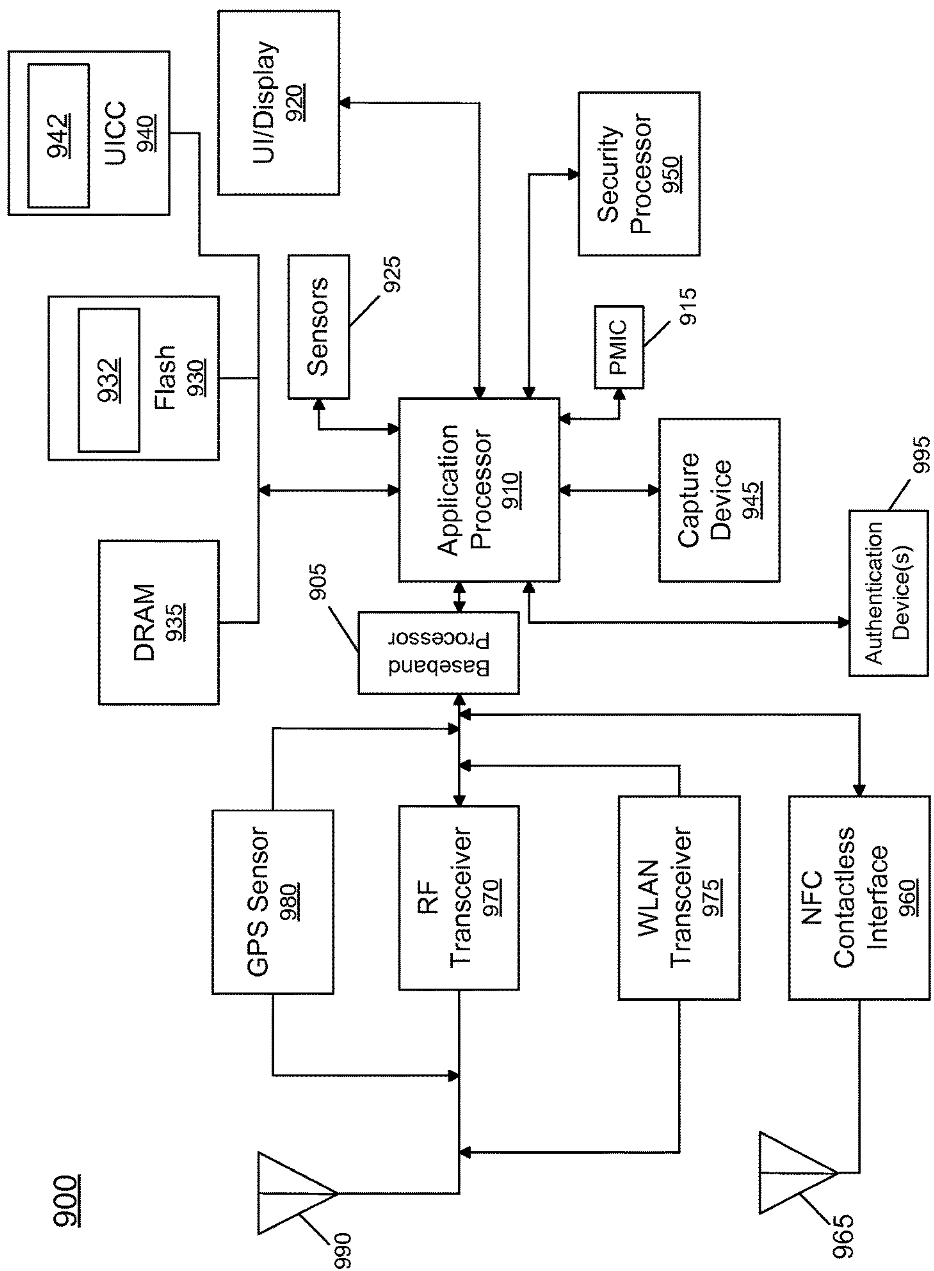
FIG. 4 is a block diagram of an example system with which embodiments can be used.

Referring now to FIG. 4, shown is a block diagram of an example system with which embodiments can be used. As seen, system 900 may be a smartphone or other wireless communicator or any other IoT device. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device.

In turn, application processor 910 can couple to a user interface/display 920, e.g., a touch screen display. In addition, application processor 910 may couple to a memory system including a non-volatile memory, namely a flash memory 930 and a system memory, namely a DRAM 935. In some embodiments, flash memory 930 may include a secure portion 932 in which secrets and other sensitive information may be stored. As further seen, application processor 910 also couples to a capture device 945 such as one or more image capture devices that can record video and/or still images.

Still referring to FIG. 4, a universal integrated circuit card (UICC) 940 comprises a subscriber identity module, which in some embodiments includes a secure storage 942 to store secure user information. System 900 may further include a security processor 950 that may couple to application processor 910. A plurality of sensors 925, including one or more multi-axis accelerometers may couple to application processor 910 to enable input of a variety of sensed information such as motion and other environmental information. In addition, one or more authentication devices 995 may be used to receive, e.g., user biometric input for use in authentication operations.

As further illustrated, a near field communication (NFC) contactless interface 960 is provided that communicates in a NFC near field via an NFC antenna 965. While separate antennae are shown in FIG. 4, understand that in some implementations one antenna or a different set of antennae may be provided to enable various wireless functionality.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received such as in one or more IoT networks, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present, with location information being provided to security processor 950 for use as described herein when context information is to be used in a pairing process. Other wireless communications such as receipt or transmission of radio signals, e.g., AM/FM and other signals may also be provided. In addition, via WLAN transceiver 975, local wireless communications, such as according to a Bluetooth™ or IEEE 802.11 standard can also be realized.

Figure 5:
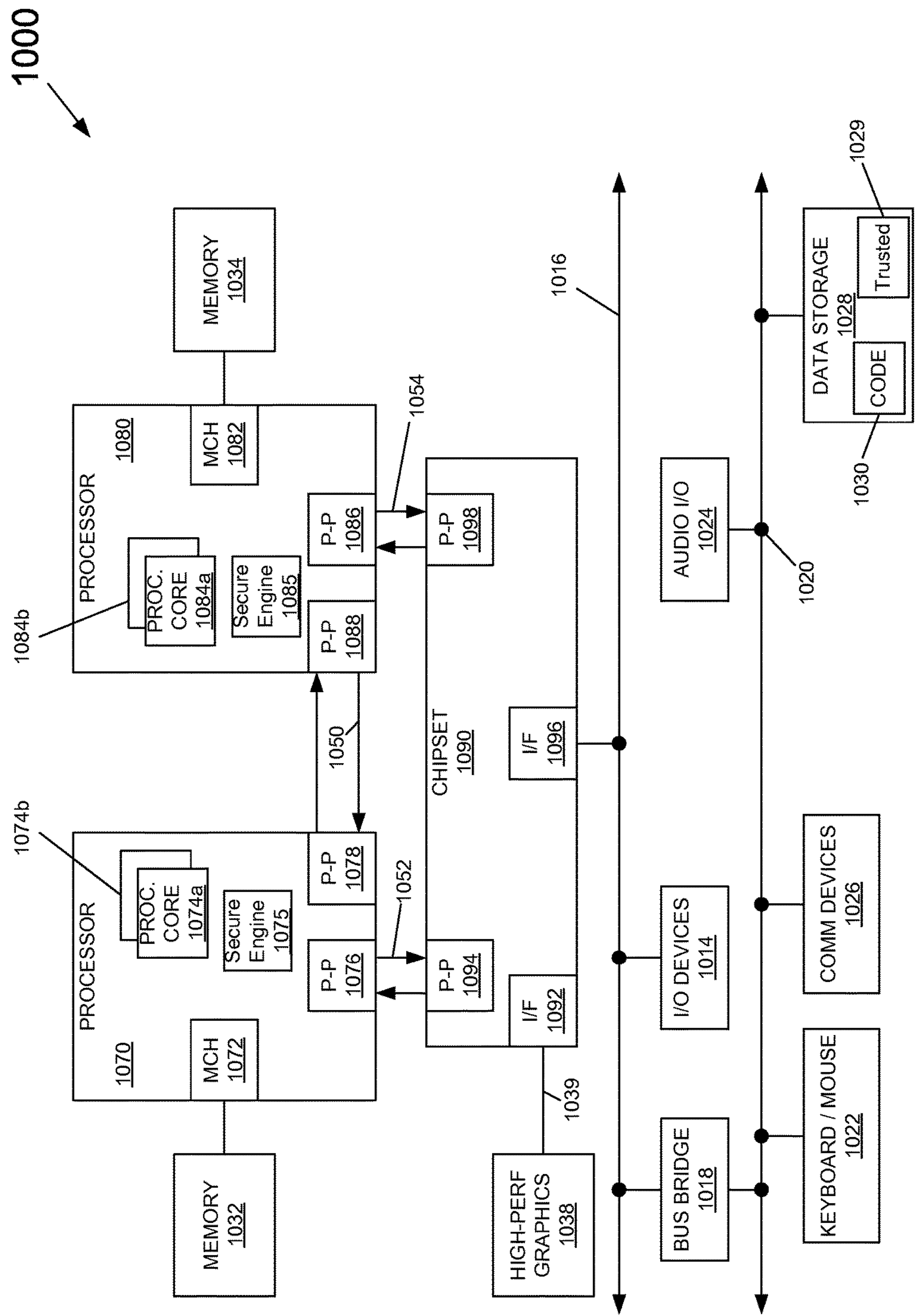
FIG. 5 is a block diagram of a system in accordance with another embodiment of the present invention.

Referring now to FIG. 5, shown is a block diagram of a system in accordance with another embodiment of the present invention. As shown in FIG. 5, multiprocessor system 1000 is a point-to-point interconnect system such as a server system, and includes a first processor 1070 and a second processor 1080 coupled via a point-to-point interconnect 1050. As shown in FIG. 5, each of processors 1070 and 1080 may be multicore processors such as SoCs, including first and second processor cores (i.e., processor cores **1074*a* and 1074*b* and processor cores 1084*a* and 1084*b*), although potentially many more cores may be present in the processors. In addition, processors 1070 and 1080 each may include a secure engine 1075 and 1085** to perform security operations such as attestations, IoT network onboarding or so forth.

Still referring to FIG. 5, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 5, MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1052 and 1054, respectively. As shown in FIG. 5, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 5, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The following examples pertain to further embodiments.

Example 1 includes at least one computer readable storage medium comprising instructions that when executed enable a system to: receive, in a rendezvous server, a first registration message from a first registrar of a first network domain, the first registration message including a first device roster of a plurality of first devices of the first network domain; receive, in the rendezvous server, a second registration message from a second registrar of a second network domain, the second registration message including a second device roster of a plurality of second devices of the second network domain; and generate a first rendezvous point based at least in part on a plurality of key management server identifiers each associated with a key management server of the first and second network domains, the first rendezvous point to enable the plurality of key management servers to perform key management exchange to generate at least one group key for communication between at least some of the first devices of the first network domain and at least some of the second devices of the second network domain.

As used herein, to "receive" and the like includes either a push or a pull action. For example, the SKDC may have a request pushed to it from a device or the SKDC may pull the request from a device. The same is true with "provide", "send", "communicate" and the like. Providing a key may include pushing the key to a device or having a device pull the key from the SKDC or even directing the device to some storage location where the device may get the key.

As used herein a "server" is both a running instance of some software that is capable of accepting requests from clients, and the computer that executes such software. Servers operate within a client-server architecture, in which "servers" are computer programs running to serve the requests of other programs, the "clients". This may be to share data, information or hardware and software resources. Examples of typical computing servers are database server, file server, mail server, print server, web server, gaming server, and application server. The clients may run on the same computer, but may connect to the server through a network. In the hardware sense, a computer primarily designed as a server may be specialized in some way for its task. Sometimes more powerful and reliable than standard desktop computers, they may conversely be simpler and more disposable if clustered in large numbers.

As used herein a "domain", in the context of networking, refers to any group of users, workstations, devices, printers, computers and database servers that share different types of data via network resources. There are also many types of subdomains. In a simple network domain, many computers and/or workgroups are directly connected. A domain is comprised of combined systems, servers and workgroups. Multiple server types may exist in one domain—such as Web, database and print—and depend on network requirements. In IoT networks sub-domains may be comprised of zones of controllers and layered control networks where a lower layer control network is isolated from a upper layer such that lower layer networks may operate autonomously from the upper layer networks.

As used herein, a "group key" is a cryptographic key that is shared between a group of users. Group keys may be distributed by sending them to individual users, either physically, or encrypted individually for each user. A use of group keys is to allow a group of users to decrypt a broadcast message that is intended for that entire group of users, and no-one else.

In some embodiments, a rendezvous point is a logical location that two or more IoT devices can agree exists at a given time of day. In some embodiments the name of the location and/or the coordinate system of the location are non-descript meaning these are not explicitly known such that an observer may not predict the second location given he happens to observe the first location. Nevertheless the IoT devices authorized to participate in meeting at the intended location can do so reliably given, in some embodiments, a strategy that changes the location frequently (e.g. daily, hourly, by minute, and the like).

In example 2 the subject matter of the Example 1 can optionally include the at least one computer readable storage medium further comprising instructions that when executed enable the system to generate a second rendezvous point based at least in part on a plurality of gateway server identifiers each associated with a gateway server of the first and second network domains, the second rendezvous point to enable publication of an encrypted message to a subscriber list including one or more of the plurality of first devices and one or more of the plurality of second devices.

As used herein, the term "gateway" includes, in a communications network, a network node equipped for interfacing with another network that uses different protocols. A gateway may contain devices such as protocol translators, impedance matching devices, rate converters, fault isolators, or signal translators as necessary to provide system interoperability. A gateway may also require the establishment of mutually acceptable administrative procedures between both networks. A protocol translation/mapping gateway interconnects networks with different network protocol technologies by performing the required protocol conversions. A gateway, in one sense, is a computer or computer program configured to perform the tasks of a gateway. Gateways, also called protocol converters, can operate at any network layer.

As used herein, "publish" and "subscribe" is a messaging pattern where senders of messages, called publishers, do not program the messages to be sent directly to specific receivers, called subscribers. Instead, published messages may be characterized into classes, without knowledge of what, if any, subscribers there may be. Similarly, subscribers express interest in one or more classes, and only receive messages that are of interest, without knowledge of what, if any, publishers there are.

In example 3 the subject matter of the Examples 1-2 can optionally include the at least one computer readable storage medium further comprising instructions that when executed enable the system to: receive, in the gateway server of the first domain, the at least one group key and the encrypted message from one or more of the plurality of first devices; and decrypt, in the gateway server of the first domain, the encrypted message.

In example 4 the subject matter of the Examples 1-3 can optionally include the at least one computer readable storage medium further comprising instructions that when executed enable the system to form a roster that includes the first device roster, the second device roster, the plurality of key management server identifiers, and the plurality of gateway server identifiers.

In example 5 the subject matter of the Examples 1-4 can optionally include the at least one computer readable storage medium further comprising instructions that when executed enable the system to: receive, in the rendezvous server, a request for the at least one group key from one of the plurality of key management servers that is: (a) associated with the second network domain, and (b) has a key management server identifier included in the roster; and receive, in the rendezvous server, a reply to the request from one of the plurality of key management servers that is: (a) associated with the first network domain, and (b) has another key management server identifier included in the roster; wherein the reply includes the at least one group key.

As used herein, an example of a "request" and a "reply" are included in Table 1 respectively as "GSK-REQ" and "GSK-REP", however "GSK-FET" may also be considered a request and "GSK-DEL" may also be considered a reply. Further details regarding such requests and replies are located at, for example, https://tools.ietf.org/id/draft-hardjono-ace-fluffy-00***txt.

In example 6 the subject matter of the Examples 1-5 can optionally include the at least one computer readable storage medium further comprising instructions that when executed enable the system to receive, in the rendezvous server at the second rendezvous point, (a) the encrypted message from one or more of the plurality of second devices via the gateway server of the second network domain, and (b) another encrypted message from one or more of the plurality of first devices without using any gateway server of the first network domain.

In example 7 the subject matter of the Examples 1-6 can optionally include the at least one computer readable storage medium further comprising instructions that when executed enable the system to generate the second rendezvous point based at least in part on an identifier associated with the another of the one or more of the plurality of first devices.

For example, the "Device-B2" of FIG. 1 may constitute an example of "the another of the one or more of the plurality of first devices."

In example 8 the subject matter of the Examples 1-7 can optionally include the at least one computer readable storage medium further comprising instructions that when executed enable the system to send, from the rendezvous server at the first rendezvous point, the at least one group key to one or more of the plurality of second devices via one of the plurality of key management servers associated with the second network domain.

In example 9 the subject matter of the Examples 1-8 can optionally include the at least one computer readable storage medium further comprising instructions that when executed enable the system to receive, in the rendezvous server, the at least one group key from one of the plurality of key management servers associated with the first network domain.

In example 10 the subject matter of the Examples 1-9 can optionally include the at least one computer readable storage medium further comprising instructions that when executed enable the system to send, from the rendezvous server, the at least one group key to one of the plurality of key management servers associated with the second network domain.

In example 11 the subject matter of the Examples 1-10 can optionally include the at least one computer readable storage medium, further comprising instructions that when executed enable the system to receive the at least one group key from one of the plurality of key management servers associated with the first network domain while the at least one group key is encrypted with a symmetric key shared between the plurality of key management servers associated with the first and second networks, wherein the rendezvous server does not possess the symmetric key.

In example 12 the subject matter of the Examples 1-11 can optionally include the at least one computer readable storage medium further comprising instructions that when executed enable the system to: receive, in the rendezvous server, the encrypted message from one or more of the plurality of second devices via the gateway server of the second network domain; and communicate, from the rendezvous server, the encrypted message to one or more of the plurality of first devices; wherein the encrypted message is encrypted with the at least one group key and the rendezvous server does not possess the at least one group key.

In example 13 the subject matter of the Examples 1-12 can optionally include the at least one computer readable storage medium further comprising instructions that when executed enable the system to: generate the first rendezvous point based at least in part on a hash of the plurality of key management server identifiers; and generate the second rendezvous point based at least in part on a hash of the plurality of gateway server identifiers.

In example 14 the subject matter of the Examples 1-13 can optionally include the at least one computer readable storage medium further comprising instructions that when executed enable the system to: receive, in the rendezvous server, a request for the at least one group key from one of the plurality of key management servers associated with the second network domain; and receive, in the rendezvous server, a reply to the request from one of the plurality of key management servers associated with the first network domain; wherein the reply includes the at least one group key and context indicating the at least one group key corresponds to cross domain device-to-device interactions.

In example 15 the subject matter of the Examples 1-14 can optionally include the at least one computer readable storage medium further comprising instructions that when executed enable the system to receive, in the rendezvous server at the second rendezvous point, the encrypted message from one or more of the plurality of second devices; wherein the one or more of the plurality of second devices are constrained.

As used herein "constrained" refers to an execution environment that is absent one or more critical resources typical of computation (e.g., memory, storage, computing, networking capacity). The constraint may be threshold based where some level of operation existing resources is depleted, but meaningful function/behavior is achieved. Survivability science is the science of meaningful computation subsequent to loss of computational resources. Some devices may be manufactured to be operating in "survival" mode by default. They can perform some duties but not all that may otherwise be expected of a device. For example, a constrained device may be constrained because it may lack credentials due to credential caching and replacement policy that deletes a less used credential in order to find resources for a more immediately used credential. The constraint of the storage for credentials requires the device to more frequently consult a key management service to re-obtain the deleted credential. As a result, the restrained device has a loss of autonomy or possibly loss of security and privacy due to its need to more frequently access credential servers that exist outside of a local realm that includes the device.

In example 16 the subject matter of the Examples 1-15 can optionally include the at least one computer readable storage medium further comprising instructions that when executed: receive, in the rendezvous server, a third registration message from a third registrar of a third network domain, the third registration message including a third device roster of a plurality of third devices of the third network domain; and generate the first rendezvous point based at least in part on a key management server identifier associated with a key management server of the third network domain; wherein the at least one group key is for communication between (a) at least some of the first and second devices of the first and second network domains, and (b) at least some of the third devices of the third network domain.

In example 17 the subject matter of the Examples 1-16 can optionally include the at least one computer readable storage medium further comprising instructions that when executed enable the system to receive the at least one group key from one of the plurality of key management servers associated with the first network domain while the at least one group key is encrypted with a symmetric key shared between the plurality of key management servers associated with the first, second, and third networks, wherein the rendezvous server does not possess the symmetric key.

In example 18 the subject matter of the Examples 1-17 can optionally include the at least one computer readable storage medium further comprising instructions that when executed enable the system to: receive, in the rendezvous server, the encrypted message from one or more of the plurality of second devices via the gateway server of the second network domain; and communicate, from the rendezvous server, the encrypted message to one or more of the plurality of first devices and one or more of the plurality of third devices; wherein the encrypted message is encrypted with the at least one group key and the rendezvous server does not possess the at least one group key.

In example 19 the subject matter of the Examples 1-18 can optionally include the at least one computer readable storage medium further comprising instructions that when executed enable the system to: receive the at least one group key from one of the plurality of key management servers associated with the first network domain while the at least one group key is encrypted with a symmetric key shared between the plurality of key management servers associated with the first, second, and third networks; wherein the rendezvous server does not possess the symmetric key.

In example 20 the subject matter of the Examples 1-19 can optionally include the at least one computer readable storage medium further comprising instructions that when executed enable the system to: receive, in the rendezvous server, a request for the at least one group key from one of the plurality of key management servers associated with the second network domain; receive, in the rendezvous server, a reply to the request from one of the plurality of key management servers associated with the first network domain; receive, in the rendezvous server, an additional request for the at least one group key from one of the plurality of key management servers associated with the third network domain; receive, in the rendezvous server, an additional reply to the additional request from one of the plurality of key management servers associated with the first network domain; wherein the reply and the additional reply each include the at least one group key.

Example 21 includes a semiconductor processing method comprising at least one computer readable storage medium comprising instructions that when executed enable a system to: receive, in a rendezvous server, a first registration message including a first device roster corresponding to a first device of a first network domain; receive, in the rendezvous server, a second registration message including a second device roster corresponding to a second device of a second network domain; and generate a first rendezvous point based at least in part on key management server identifiers associated with first and second key management servers of the first and second network domains, the first rendezvous point to enable the first and second key management servers to perform key management exchange to generate a key for communication between the first device and the second device.

In example 22 the subject matter of the Example 21 can optionally include the at least one computer readable storage medium further comprising instructions that when executed enable the system to generate a second rendezvous point based at least in part on gateway server identifiers associated with first and second gateway servers of the first and second network domains, the second rendezvous point to enable communication of an encrypted message between the first and second devices.

In example 23 the subject matter of the Examples 21-22 can optionally include the at least one computer readable storage medium further comprising instructions that when executed enable the system to: receive, in the rendezvous server, the key from the first key management server while the key is encrypted with a symmetric key shared between the first and second key management servers; and send, from the rendezvous server, the key to the second key management server; wherein the rendezvous server does not possess the symmetric key.

Example 24 includes at least one computer readable storage medium comprising instructions that when executed enable a system to: couple a first key management server of a first network domain to a rendezvous server at a first rendezvous point; couple the first key management server to the rendezvous server at a second rendezvous point; receive, in the first key management server, a request for a group key from a first device of the first network domain; receive, in the first key management server, a reply to the request from the second key management server; wherein the reply includes the group key; wherein (a) the first rendezvous point is based on: (a)(i) a first key management server identifier associated with the first key management server, and (a)(ii) a second key management server identifier associated with a second key management server of a second network domain; and (b) the second rendezvous point is based on: (b)(i) a first gateway server identifier associated with a first gateway server of the first network domain, and (b)(ii) a second gateway server identifier associated with a second gateway server of the second network domain; wherein (c) the first rendezvous point is to enable the first and second key management servers to perform key management exchange to generate a group key for communication between a first device of the first network domain and a second device of the second network domain; and (d) the second rendezvous point is to enable publication of an encrypted message to a subscriber list including devices from the first and second network domains.

In example 25 the subject matter of Example 24 can optionally include the at least one computer readable storage medium of claim 24, further comprising instructions that when executed enable the system to receive, in the first key management server, the group key from second key management server while the group key is encrypted with a symmetric key shared between the first and second key management servers.

In Example 26 a SKDC server may be used to implement a full key lifecycle wherein a group key may be revoked or identified for deletion by a device or SKDC in a first domain. The SKDC may signal a second domain (which is sharing the group key) to likewise remove instances of the group key from SKDCs within the second domain and devices within the second domain. As a result, content protected using the group key may no longer be decrypted/consumed by new acquirers of the key (though the encrypted contents may exist on storage media). Such an embodiment further facilitates distribution of revocation policies among a group of uncompromised devices (that regard the group key as compromised by a compromised device) such that any attempt to present the group key to an uncompromised device (by either a compromised or uncompromised device) will be denied by the uncompromised device.

Example 1a includes an apparatus comprising: at least one memory; at least one processor, coupled to the memory, to perform operations comprising: receiving, in a rendezvous server, a first registration message from a first registrar of a first network domain, the first registration message including a first device roster of a plurality of first devices of the first network domain; receiving, in the rendezvous server, a second registration message from a second registrar of a second network domain, the second registration message including a second device roster of a plurality of second devices of the second network domain; and generating a first rendezvous point based at least in part on a plurality of key management server identifiers each associated with a key management server of the first and second network domains, the first rendezvous point to enable the plurality of key management servers to perform key management exchange to generate at least one group key for communication between at least some of the first devices of the first network domain and at least some of the second devices of the second network domain.

Example 2a includes apparatus of example 1a, the operations comprising generating a second rendezvous point based at least in part on a plurality of gateway server identifiers each associated with a gateway server of the first and second network domains, the second rendezvous point to enable publication of an encrypted message to a subscriber list including one or more of the plurality of first devices and one or more of the plurality of second devices.

Example 3a includes the apparatus of example 2a, the operations comprising: receiving, in the gateway server of the first domain, the at least one group key and the encrypted message from one or more of the plurality of first devices; and decrypting, in the gateway server of the first domain, the encrypted message.

Example 4a includes the apparatus of example 2a, the operations comprising forming a roster that includes the first device roster, the second device roster, the plurality of key management server identifiers, and the plurality of gateway server identifiers.

Example 5a includes the apparatus of example 4a, the operations comprising: receiving, in the rendezvous server, a request for the at least one group key from one of the plurality of key management servers that is: (a) associated with the second network domain, and (b) has a key management server identifier included in the roster; and receiving, in the rendezvous server, a reply to the request from one of the plurality of key management servers that is: (a) associated with the first network domain, and (b) has another key management server identifier included in the roster; wherein the reply includes the at least one group key.

Example 6a includes the apparatus of example 2a, the operations comprising receiving, in the rendezvous server at the second rendezvous point, (a) the encrypted message from one or more of the plurality of second devices via the gateway server of the second network domain, and (b) another encrypted message from one or more of the plurality of first devices without using any gateway server of the first network domain.

Example 7a includes the apparatus of example 6a, the operations comprising generating the second rendezvous point based at least in part on an identifier associated with the another of the one or more of the plurality of first devices.

Example 8a includes the apparatus of example 6a, the operations comprising sending, from the rendezvous server at the first rendezvous point, the at least one group key to one or more of the plurality of second devices via one of the plurality of key management servers associated with the second network domain.

Example 9a includes the apparatus of example 2a, the operations comprising: receiving, in the rendezvous server, the at least one group key from one of the plurality of key management servers associated with the first network domain; and sending, from the rendezvous server, the at least one group key to one of the plurality of key management servers associated with the second network domain.

Example 10a includes the apparatus of example 9a, the operations comprising receiving the at least one group key from one of the plurality of key management servers associated with the first network domain while the at least one group key is encrypted with a symmetric key shared between the plurality of key management servers associated with the first and second networks, wherein the rendezvous server does not possess the symmetric key.

Example 11 include the apparatus of example 10a, the operations comprising: receiving, in the rendezvous server, the encrypted message from one or more of the plurality of second devices via the gateway server of the second network domain; and communicating, from the rendezvous server, the encrypted message to one or more of the plurality of first devices; wherein the encrypted message is encrypted with the at least one group key and the rendezvous server does not possess the at least one group key.

Example 12a includes the apparatus of example 2a, the operations comprising: generating the first rendezvous point based at least in part on a hash of the plurality of key management server identifiers; and generating the second rendezvous point based at least in part on a hash of the plurality of gateway server identifiers.

Example 13a includes the apparatus of example 1a, the operations comprising: receiving, in the rendezvous server, a request for the at least one group key from one of the plurality of key management servers associated with the second network domain; and receiving, in the rendezvous server, a reply to the request from one of the plurality of key management servers associated with the first network domain; wherein the reply includes the at least one group key and context indicating the at least one group key corresponds to cross domain device-to-device interactions.

Example 14a includes the apparatus of example 1a, the operations comprising: receiving, in the rendezvous server, a third registration message from a third registrar of a third network domain, the third registration message including a third device roster of a plurality of third devices of the third network domain; and generating the first rendezvous point based at least in part on a key management server identifier associated with a key management server of the third network domain; wherein the at least one group key is for communication between (a) at least some of the first and second devices of the first and second network domains, and (b) at least some of the third devices of the third network domain.

Example 15a includes the apparatus of example 14a, the operations comprising: receiving, in the rendezvous server, the encrypted message from one or more of the plurality of second devices via the gateway server of the second network domain; and communicating, from the rendezvous server, the encrypted message to one or more of the plurality of first devices and one or more of the plurality of third devices; wherein the encrypted message is encrypted with the at least one group key and the rendezvous server does not possess the at least one group key.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory computer readable storage medium comprising instructions that when executed enable a system to:

receive, in a rendezvous server, a first registration message from a first registrar of a first network domain, the first registration message including a first device roster of a plurality of first devices of the first network domain;

receive, in the rendezvous server, a second registration message from a second registrar of a second network domain, the second registration message including a second device roster of a plurality of second devices of the second network domain; and generate a first rendezvous point based at least in part on a plurality of key management server identifiers each associated with a key management server of a plurality of key management servers of the first and second network domains, the first rendezvous point to enable the plurality of key management servers to perform key management exchange to generate at least one group key for communication between at least some of the first devices of the first network domain and at least some of the second devices of the second network domain;

in response to generating the first rendezvous point, enable a secure channel between the at least some of the first devices of the first network domain and the at least some of the second devices of the second network domain.

2. The at least one computer readable storage medium of claim 1, further comprising instructions that when executed enable the system to generate a second rendezvous point based at least in part on a plurality of gateway server identifiers each associated with a gateway server of the first and second network domains, the second rendezvous point to enable publication of an encrypted message to a subscriber list including one or more of the plurality of first devices and one or more of the plurality of second devices.

3. The at least one computer readable storage medium of claim 2, further comprising instructions that when executed enable the system to:

receive, in the gateway server of the first domain, the at least one group key and the encrypted message from one or more of the plurality of first devices; and decrypt, in the gateway server of the first domain, the encrypted message.

4. The at least one computer readable storage medium of claim 2, further comprising instructions that when executed enable the system to form a roster that includes the first device roster, the second device roster, the plurality of key management server identifiers, and the plurality of gateway server identifiers.

5. The at least one computer readable storage medium of claim 4, further comprising instructions that when executed enable the system to:

receive, in the rendezvous server, a request for the at least one group key from one of the plurality of key management servers that is: (a) associated with the second network domain, and (b) has a key management server identifier included in the roster; and receive, in the rendezvous server, a reply to the request from one of the plurality of key management servers that is: (a) associated with the first network domain, and (b) has another key management server identifier included in the roster;

wherein the reply includes the at least one group key.

6. The at least one computer readable storage medium of claim 2, further comprising instructions that when executed enable the system to receive, in the rendezvous server at the second rendezvous point, (a) the encrypted message from one or more of the plurality of second devices via the gateway server of the second network domain, and (b) another encrypted message from one or more of the plurality of first devices without using any gateway server of the first network domain.

7. The at least one computer readable storage medium of claim 6, further comprising instructions that when executed enable the system to generate the second rendezvous point based at least in part on an identifier associated with another of the one or more of the plurality of first devices.

8. The at least one computer readable storage medium of claim 6, further comprising instructions that when executed enable the system to send, from the rendezvous server at the first rendezvous point, the at least one group key to one or more of the plurality of second devices via one of the plurality of key management servers associated with the second network domain.

9. The at least one computer readable storage medium of claim 2, further comprising instructions that when executed enable the system to receive, in the rendezvous server, the at least one group key from one of the plurality of key management servers associated with the first network domain.

10. The at least one computer readable storage medium of claim 9, further comprising instructions that when executed enable the system to send, from the rendezvous server, the at least one group key to one of the plurality of key management servers associated with the second network domain.

11. The at least one computer readable storage medium of claim 10, further comprising instructions that when executed enable the system to receive the at least one group key from one of the plurality of key management servers associated with the first network domain while the at least one group key is encrypted with a symmetric key shared between the plurality of key management servers associated with the first and second networks, wherein the rendezvous server does not possess the symmetric key.

12. The at least one computer readable storage medium of claim 11, further comprising instructions that when executed enable the system to:

receive, in the rendezvous server, the encrypted message from one or more of the plurality of second devices via the gateway server of the second network domain; and communicate, from the rendezvous server, the encrypted message to one or more of the plurality of first devices;

wherein the encrypted message is encrypted with the at least one group key and the rendezvous server does not possess the at least one group key.

13. The at least one computer readable storage medium of claim 2, further comprising instructions that when executed enable the system to:

generate the first rendezvous point based at least in part on a hash of the plurality of key management server identifiers; and generate the second rendezvous point based at least in part on a hash of the plurality of gateway server identifiers.

14. The at least one computer readable storage medium of claim 1, further comprising instructions that when executed enable the system to:

receive, in the rendezvous server, a request for the at least one group key from one of the plurality of key management servers associated with the second network domain; and receive, in the rendezvous server, a reply to the request from one of the plurality of key management servers associated with the first network domain;

wherein the reply includes the at least one group key and context indicating the at least one group key corresponds to cross domain device-to-device interactions.

15. The at least one computer readable storage medium of claim 2, further comprising instructions that when executed enable the system to receive, in the rendezvous server at the second rendezvous point, the encrypted message from one or more of the plurality of second devices; wherein the one or more of the plurality of second devices are constrained.

16. The at least one computer readable storage medium of claim 2, further comprising instructions that when executed:

receive, in the rendezvous server, a third registration message from a third registrar of a third network domain, the third registration message including a third device roster of a plurality of third devices of the third network domain; and generate the first rendezvous point based at least in part on a key management server identifier associated with a key management server of the third network domain;

wherein the at least one group key is for communication between (a) at least some of the first and second devices of the first and second network domains, and (b) at least some of the third devices of the third network domain.

17. The at least one computer readable storage medium of claim 16, further comprising instructions that when executed enable the system to receive the at least one group key from one of the plurality of key management servers associated with the first network domain while the at least one group key is encrypted with a symmetric key shared between the plurality of key management servers associated with the first, second, and third networks, wherein the rendezvous server does not possess the symmetric key.

18. The at least one computer readable storage medium of claim 16, further comprising instructions that when executed enable the system to:

receive, in the rendezvous server, the encrypted message from one or more of the plurality of second devices via the gateway server of the second network domain; and communicate, from the rendezvous server, the encrypted message to one or more of the plurality of first devices and one or more of the plurality of third devices;

wherein the encrypted message is encrypted with the at least one group key and the rendezvous server does not possess the at least one group key.

19. The at least one computer readable storage medium of claim 16, further comprising instructions that when executed enable the system to:

receive the at least one group key from one of the plurality of key management servers associated with the first network domain while the at least one group key is encrypted with a symmetric key shared between the plurality of key management servers associated with the first, second, and third networks;

wherein the rendezvous server does not possess the symmetric key.

20. The at least one computer readable storage medium of claim 16, further comprising instructions that when executed enable the system to:

receive, in the rendezvous server, a request for the at least one group key from one of the plurality of key management servers associated with the second network domain;

receive, in the rendezvous server, a reply to the request from one of the plurality of key management servers associated with the first network domain;

receive, in the rendezvous server, an additional request for the at least one group key from one of the plurality of key management servers associated with the third network domain;

receive, in the rendezvous server, an additional reply to the additional request from one of the plurality of key management servers associated with the first network domain;

wherein the reply and the additional reply each include the at least one group key.

21. At least one non-transitory computer readable storage medium comprising instructions that when executed enable a system to:

receive, in a rendezvous server, a first registration message including a first device roster corresponding to a first device of a first network domain;

receive, in the rendezvous server, a second registration message including a second device roster corresponding to a second device of a second network domain; and generate a first rendezvous point based at least in part on key management server identifiers associated with first and second key management servers of the first and second network domains, the first rendezvous point to enable the first and second key management servers to perform key management exchange to generate a key for communication between the first device and the second device in response to generating the first rendezvous point, enable a secure channel between the first and second devices.

22. The at least one computer readable storage medium of claim 21, further comprising instructions that when executed enable the system to generate a second rendezvous point based at least in part on gateway server identifiers associated with first and second gateway servers of the first and second network domains, the second rendezvous point to enable communication of an encrypted message between the first and second devices.

23. The at least one computer readable storage medium of claim 21, further comprising instructions that when executed enable the system to:

receive, in the rendezvous server, the key from the first key management server while the key is encrypted with a symmetric key shared between the first and second key management servers; and send, from the rendezvous server, the key to the second key management server;

wherein the rendezvous server does not possess the symmetric key.

24. At least one non-transitory computer readable storage medium comprising instructions that when executed enable a system to:

couple a first key management server of a first network domain to a rendezvous server at a first rendezvous point;

couple the first key management server to the rendezvous server at a second rendezvous point;

receive, in the first key management server, a request for a group key from a first device of the first network domain;

receive, in the first key management server, a reply to the request from a second key management server;

in response to coupling the first key management server to the rendezvous server at the first rendezvous point, enable a secure channel between at least some devices of the first network domain and at least some devices of a second network domain;

wherein the reply includes the group key;

wherein (a) the first rendezvous point is based on: (a)(i) a first key management server identifier associated with the first key management server, and (a)(ii) a second key management server identifier associated with the second key management server of the second network domain; and (b) the second rendezvous point is based on: (b)(i) a first gateway server identifier associated with a first gateway server of the first network domain, and (b)(ii) a second gateway server identifier associated with a second gateway server of the second network domain;

wherein (c) the first rendezvous point is to enable the first and second key management servers to perform key management exchange to generate the group key for communication between the at least some devices of the first network domain and the at least some devices of the second network domain; and (d) the second rendezvous point is to enable publication of an encrypted message to a subscriber list including devices from the first and second network domains.

25. The at least one computer readable storage medium of claim 24, further comprising instructions that when executed enable the system to receive, in the first key management server, the group key from the second key management server while the group key is encrypted with a symmetric key shared between the first and second key management servers;

wherein the subscriber list corresponds to a publication-subscription protocol.

* * * * *